United States Patent Office 3,205,123
Patented Sept. 7, 1965

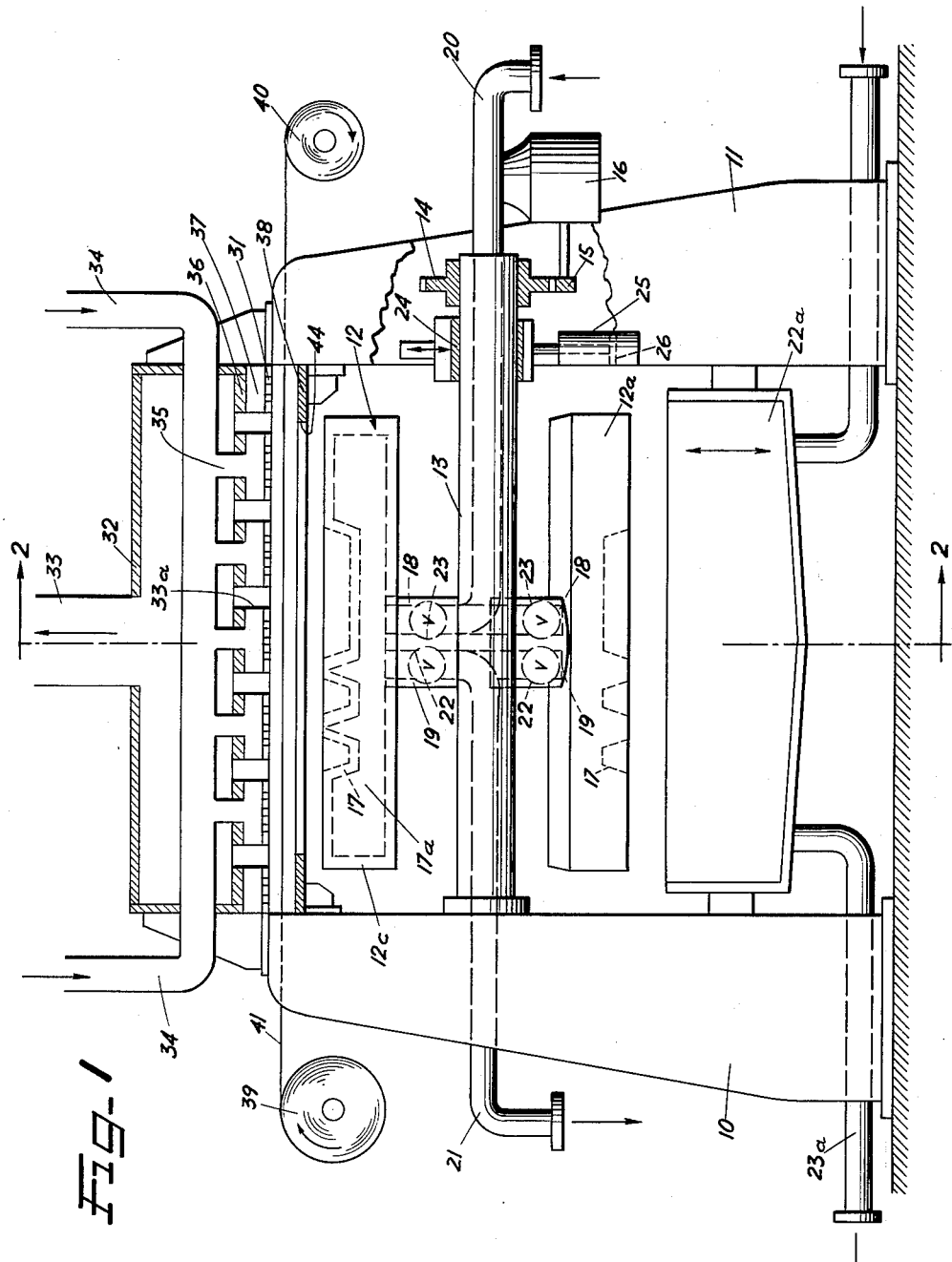

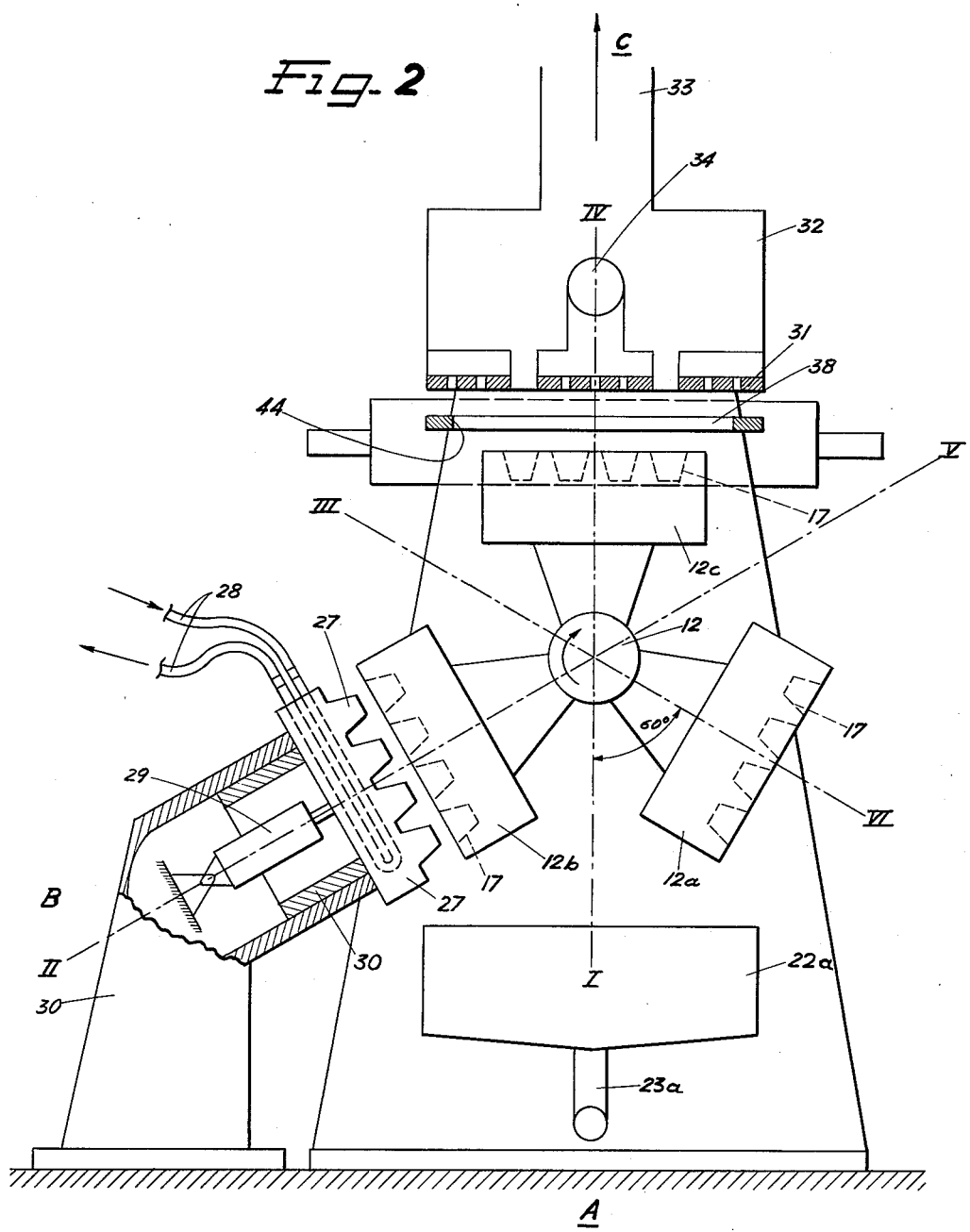

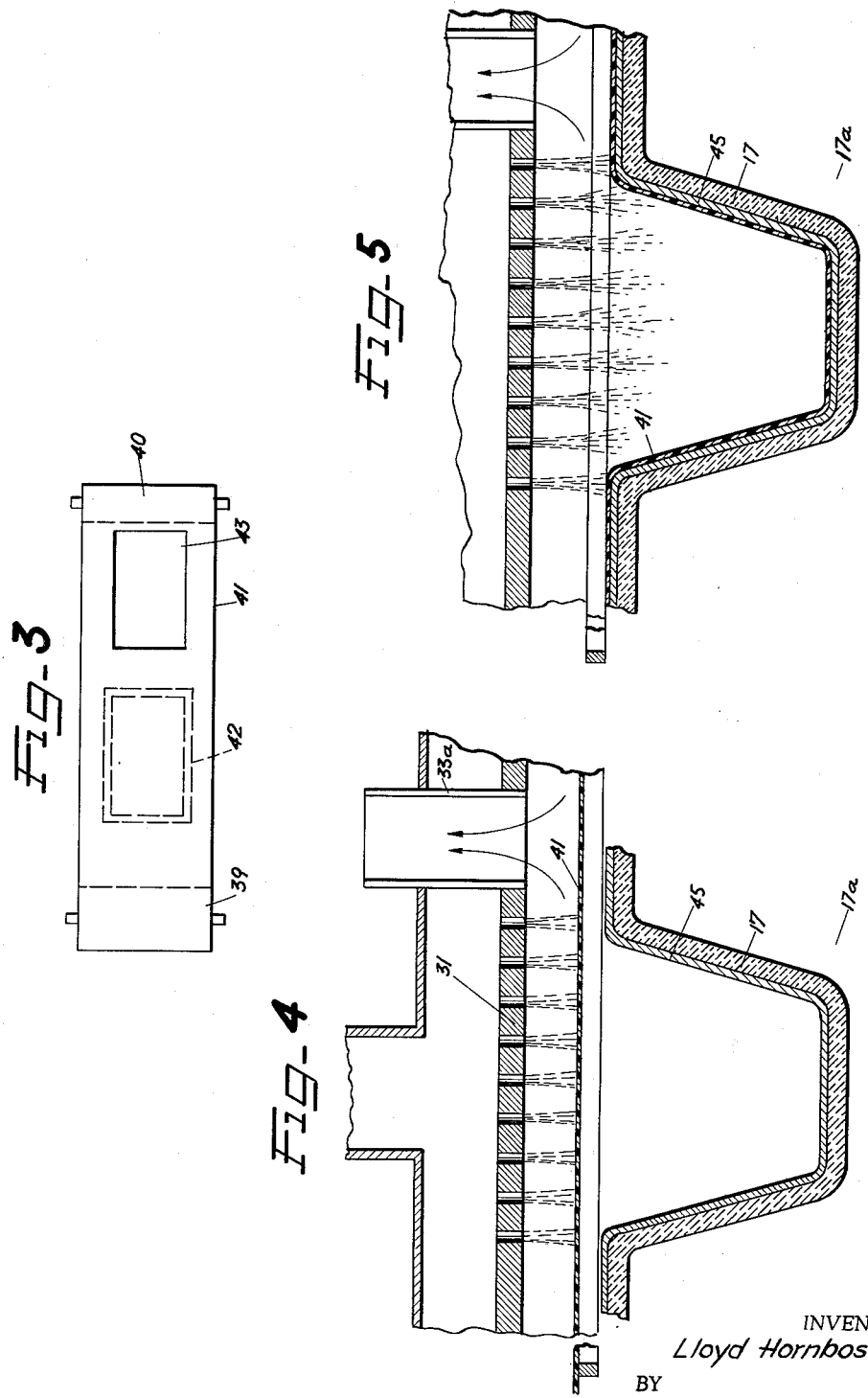

3,205,123
METHOD AND APPARATUS FOR APPLYING A PLASTIC SHEET TO A PULP MOLDED ARTICLE ON THE MOLD
Lloyd Hornbostel, Jr., Beloit, Wis., assignor to Beloit Corp., Beloit, Wis., a corporation of Wisconsin
Filed Aug. 31, 1962, Ser. No. 220,793
11 Claims. (Cl. 162—103)

The present invention relates to improvements in a method and mechanism for making molded fiber articles having an integral surface covering of plastic material.

Molded pulp articles are used for packaging various products which will wet the surface of the package or will exude vapors or liquids. A practical package for such products is provided with a moisture and vapor-proof lining or layer that protects the molded pulp wall of the package from being wetted and losing its strength and which prevents the free passage of vapors through the package wall from the product or to the product from external sources. For the successful packaging of such products it is necessary that the package be sufficiently strong to withstand machine handling during filling operations and it in particular should withstand rough handling during shipping and storage.

A successful inexpensive type of package has been formed of a molded pulp coated with a layer of plastic to form a liner. This has been done by several methods, and in one method it has been customary to form the package from a flat precoated stock or board, cutting and folding the board into the desired form for a receptacle. This forming operation obviously tends to break or weaken the coating along the fold lines or creases, resulting in leakage or contamination of the product to be packed.

Another method employs conventional fiber molding techniques using a forming mold of the desired shape. After the pulp article has been pressed and dried it is transported to a second machine where a plastic film is applied to the inner or outer walls. This operation usually requires three steps after the article has been made. The article is preheated to the temperature required for bonding the plastic film thereto. The plastic film is next preformed to the configuration of the molded pulp article. Then, with the use of a male and female die, and under the application of heat, the plastic sheet is drawn to the desired configuration. A disadvantage is encountered in that due to the high plasticity of the sheet there tends to be a higher rate of flow of the plastic material in the region where the plastic sheet is held fixed. This will result in an uneven thickness of the plastic material after the drawing operation has been completed, and it limits both the thickness of material that may be used, and the depth to which the plastic material may be drawn. The last step consists of bringing the preheated pulp article and plastic sheet together under pressure, and thus bonding or laminating the two together. The last step usually requires a bonding agent or glue.

It is accordingly an object of the present invention to provide an improved mechanism and method for manufacturing plastic coated molded pulp articles which avoid the disadvantages and limitations of processes and structures heretofore available, and wherein an improved article is made by a more rapid operation and in a single process which is well suited to be adapted for use in a single machine.

A further object of the invention is to provide an improved method and mechanism for making a plastic coated shaped molded pulp article and particularly to provide an improved molded pulp base for the plastic coating wherein the pulp article is not dried by conventional methods such as oven or tunnel dryers wherein the surface of the article becomes hard and dense, but wherein the pulp article remains porous for the improved application of the plastic layer.

A still further object of the invention is to provide an improved mechanism for making plastic coated molded pulp articles wherein the conventionally required press dies for bonding the plastic film to the pulp article are eliminated.

A still further object of the invention is to provide an improved method and apparatus for making plastic coated molded pulp articles wherein the need for adhesives and bonding agents is eliminated.

A still further object of the invention is to provide an improved method and apparatus for making an article of the type described wherein the range of type of article and the variability of design is greatly extended making it possible to provide relatively deep molded products without having variations in thickness of the plastic film.

A still further object of the invention is to provide an improved method which makes possible the use of a single fast acting machine in the making of a plastic covered molded pulp article and wherein various functions of operation are used to serve dual purposes.

Other objects, advantages and features of the invention will become more apparent with the teaching of the principles of the invention in connection with the disclosure of the preferred embodiment thereof in the specification, claims and drawings, in which:

FIGURE 1 is a side elevational view shown with parts broken away and in somewhat schematic form of a mechanism constructed and operating in accordance with the principles of the present invention;

FIGURE 2 is a vertical sectional view shown in somewhat schematic form, taken substantially along line II—II of FIGURE 1;

FIGURE 3 is a top plan schematic view showing the sheet of plastic which is bonded to the molded pulp article;

FIGURE 4 is an enlarged detailed vertical sectional view illustrating the position of the elements as the plastic is being preheated before bonding; and FIGURE 5 is a view similar to FIGURE 4 showing the position of the elements just after the plastic has been drawn to the molded pulp article.

On the drawings:

FIGURES 1 and 2 show a machine for maufacturing molded fiber articles with an interior lining of plastic material. The mechanism is supported on end columns 10 and 11 which rotatably support an indexible rotor or turret 12 which rotates in stepwise movement through a series of operating stations.

The turret 12 has a series of uniformly cirumferentially spaced heads 12a, 12b and 12c which radially positioned of the center of the turret and are supported on a rotating central hub 13 adequately supported in bearings on the end columns 10 and 11.

The hub 13 and the turret 12 are mounted for vertical reciprocating movement as well as rotational movement. For rotating the turret 12 the hub 13 is provided with a driving gear 14 driven by a pinion 15 from a motor 16. As will be appreciated, various types of drives can be employed, and for example a Geneva drive would be capable of intermittently moving the heads through the operating stations, but for convenience the arrangement is shown being driven by gears operated by a motor 16 which may be intermittently actuated and stopped by a brake.

For vertically moving the turret 12, the support bearings 24 at each end are guided in vertical slots in the end columns 10 and 11. Cylinders 25 are supported on the columns with pistons 26 slidable therein and the piston rods are secured to the bearings 24 for vertically positioning the turret. During normal operation the turret will be positioned as illustrated with its axis in a centered position, and vertical movement will occur only at predetermined times as will later become clear. It will of course be understood that both ends of the turret 12 are simultaneously moved up or down, although since the apparatus and support is the same, only one end need be shown, and operating pressure air lines or hydraulic lines will connect to the cylinders.

As illustrated in FIGURE 2 the turret in the embodiment shown has three heads 12a, 12b and 12c, and is indexible through six positions, so that with each indexing movement each head moves forwardly 60°. While the heads move forwardly through six positions the machine is provided with only three operating stations and thus some of the operating stations can be idle while other stations are in operation.

Generally, the machine has stations A, B and C. The positions for the heads are numbered I through VI. Station A is at position I and station B is at position II. Station C is at position IV. Therefore each head will move through each of the six positions in making a full revolution on the turret, and will move through 60° between each position. The stations, however, are not uniformly spaced, and a head will move 60° between stations A and B, but will move through 120° from stations B to C.

Each of the heads is provided with molds 17 which are shaped in accordance with the articles to be formed. The molds are formed of a porous material having a smooth inner surface such as glass beads bonded together with an epoxy resin. Behind the molds is a suction chamber 17a to which vacuum is applied through a line 19 connecting to the head behind the mold as illustrated by the head 12c in FIGURE 1. Vacuum is applied while molding the pulp within the mold, while drying the pulp article, and while lining the dried pulp article with plastic. The line 19 to the individual head connects to a main vacuum line 21 leading axially to the end of the rotor or turret 12. Control of vacuum to the head is obtained by an individual control valve 22.

For pressurizing the head to eject the completed article, a line 18 leads to the head and connects to a pressure line 20 leading axially out through the end of the turret. Control of pressure to the individual heads is obtained by a valve 23 in the branch line 18. The supply pressure line 20 and supply vacuum line 21 are of course provided with suitable rotational connections and connect to pumps or systems which need not be shown in detail.

The molds may be concave or convex and are of various ous shapes, and the drawings illustrate molds of different sizes by way of example.

At station A is positioned a stock pan 22a supplied with a pulp slurry through a line 23a. A suitable pulp slurry for example may consist of 90% ground wood, and 10% Kraft at one and one-half percent consistency. The slurry is supplied by suitable pump, not shown.

In operation, each head is successively positioned above the stock pan 22a, and the turret is then lowered vertically so that the head enters the pan and the molds are submerged beneath the surface of the slurry for a brief period of time on the order of five seconds while vacuum is applied to the head. A vacuum of five inches of Hg may be applied for a suitable period of time and a layer of pulp will be formed on the inner surface of the mold 17 to form the pulp portion of the article. The head is then raised and indexed to station B.

The pulp article which has been formed in the mold is now pressed. A rubber bladder die 27 shaped in accordance with the mold is now pressed against the mold. For applying an intimate pressure the bladder 27 may be inflated against the mold surface. This pressing may be a cold or a hot operation and lines 28 are illustrated as providing a supply of steam for heating, or as providing pressurized air or steam for inflating a rubber bladder. Also, heated metal dies may be used instead of an inflatable bladder. The pressing die is moved against the head, and as shown in FIGURE 2 the head 12b receives the pressing die by operation of a pressing cylinder 29 having a piston therein for moving the die 27 outwardly against the head 12b. The die is supported on a stand 30.

As will be observed, the pressing die 27 is operated on the head 12b while the head 12c ahead of it is operated on station C. However, when the head 12a moves down into the forming station A, both heads 12b and 12c will be at intermediate stations, or in other words at positions III and VI respectively, so that the turret can move vertically without interfering with operations at either stations B or C.

At station C the formed fiber article is dried and a layer of plastic is applied to the exposed surface thereof. Station C includes a perforate plate 31 facing downwardly toward the head in the station (shown as 12c in FIGURE 2) and heated air is directed downwardly through the preforate plate 31. Heated air is supplied through the perforate plate 31 from air supply lines 34 which direct heated air downwardly through distributor portions 35 through a plate 36 into a plenum chamber 37 above the perforate plate 31. Air is removed from the area below the perforate plate 31, after it has heated the materials therebelow, through lines 33a which lead upwardly to a plenum chamber 32 exhausted through a line 33. This is also illustrated in detail in FIGURES 4 and 5.

When the mold head first indexes into station C, heated air is directed downwardly into the molds 17 and vacuum within the head draws the air through the pulp article continuously while drying. After about 40 to 60 seconds of drying at approximately 300° F. the article will be dry and the surface of the article is hot to be ready for receiving the plastic layer. Thus the heat of drying is utilized by applying the plastic immediately after the drying procedure.

Further, the article has good porosity due to the vacuum being applied, and a continual flow of air passing through the article during the drying operation.

A film of plastic 41, FIGURES 1 and 3 is then drawn forwardly over the top of the head 12c but spaced above the head as illustrated in FIGURE 4. The film is drawn forwardly by the rotation of a windup roll 40 and is fed from a supply roll 39.

Positioned at a location spaced above the head 12c in its normal position is a grid plate 38. The grid plate has an opening 44 therethrough through which the plastic is drawn when it is applied to the surface of the article.

However, the film is first drawn across above the article spaced from it so that it will not be drawn into the pockets of the individual molds against the article. This permits the film to be preheated by the flow of air from the perforate plate 31, and the air which was previously used for drying the article is thus used for preheating the film 41.

The film is of a suitable plastic such as polyethylene on the order of .0015 inch thick. As soon as the plastic is briefly heated the head 12c is moved upwardly, by moving the turret upwardly, against the grid 38. The vacuum applied to the head which is drawing air through the article then draws the film of plastic down into the article for intimate contact between the plastic film and the exposed article surface. An excellent bond is obtained due to the article being preheated and due to its porosity. The film in effect is drawn to each pore of the article and bonds against the heated fibers of the article for integrally joining therewith. The film is heated and substantially flows into position forming a uniform layer shaped in accordance with the article without stress.

As will be observed from the foregoing discussion, articles of varying and intricate shapes may be employed and the articles may be of concave or convex shape, or a combination of both.

The turret is dropped down again to its axial position and the sharp edges of the grid will cut out the area of plastic which has been used to line the article leaving the opening 43 which is shown in FIGURE 3. Excess plastic at the sides of the article can be trimmed later or will cover the top edges of the article if the article is the size of the grid opening. In some instances it will be desirable to shape the opening in the grid in accordance with the shape of the article, or to provide multiple grid openings for multiple articles.

Since the overall plastic sheet 41 is wider than the opening of the grid the sides remain continuous and the sheet can be pulled forwardly when another operation is to be performed.

The turret can then be indexed and the articles removed from the mold by directing air pressure to the head. The unused plastic which is rolled onto the windup roll can be utilized by being reprocessed.

In summary, each head is indexed through a series of positions to successively pass through the forming stations. At station A the pulp article is formed by the head descending into the pulp pan 22a, at station B the pulp press engages the surface of the articles, and at station C the articles are dried and maintained in a porous condition, and while heated from the drying heat, a film of plastic is positioned against the surface retaining vacuum on the article. This causes an integral joining between the fibers of the sheet of plastic for an improved coating operation.

Thus it will be seen that I have provided an improved mechanism and method of manufacturing molded fiber articles having a lining of plastic material, which meets the objectives and advantages above set forth. The features of the method and apparatus are well adapted for continuous mass production operation. The operation can proceed automatically and the completed article is made in a single machine operation without requiring intermediate handling or transferral.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A mechanism for making plastic surfaced molded pulp articles comprising,
a porous pulp mold for supporting a shaped article,
means defining
a molding station,
a pressing station,
a drying and surfacing station,
and an ejecting station,
means for transporting said mold to each of said stations,
means at said molding station for depositing a layer of pulp on the surface of the mold,
means at said pressing station for applying a smoothing, pressing surface to the exposed surface of an article in said mold,
means at said drying and surfacing station directing a flow of heated air through the article on the mold,
means applying a layer of plastc sheet to the article while the article is at an elevated temperature,
and means at the ejecting station for removing the plastic coated article.

2. A mechanism for making plastic surfaced molded pulp articles comprising,
an article supporting porous mold,
means for applying a pulp slurry to the mold forming a pulp article on the mold surface,
means for heating the article on the mold to remove moisture therefrom,
means for supplying a thermoplastic sheet and for applying said sheet to the exposed surface of the article on the mold while the article remains warm.

3. A mechanism for making plastic surfaced molded pulp articles comprising,
an article supporting porous mold,
means applying a pulp slurry to the mold forming a pulp article on the mold surface,
means for heating the article on the mold to remove moisture,
means for drawing air inwardly through the article and mold while heating the article so that the article will remain porous as it dries,
and means for supplying a sheet of plastic material and applying said sheet to the surface of the article on the mold while the article remains warm.

4. A mechanism for making plastic surfaced molded pulp articles comprising,
an article supporting porous mold,
means applying a pulp slurry to the mold forming a pulp article on the mold surface,
vacuum means for drawing air through the mold and article thereon with the air passing inwardly through the exposed surface of the article and then through the mold,
means for supplying heated air to the exposed surface of the article on the mold,
and means for positioning a sheet of plastic between the article and the air supply so that the plastic will be heated, said sheet being drawn against the exposed surface of the article by said vacuum means.

5. A mechanism for making plastic surfaced molded pulp articles comprising,
an article supporting porous mold,
means for applying a pulp slurry to the mold forming a pulp article on the mold surface,
vacuum means for drawing air through the mold and article with the air passing inwardly through the exposed surface of the article and then through the mold,
means for supplying heated air to the exposed surface of the article on the mold,
means for positioning a sheet of plastic between the mold and the air supply spaced from the mold so as not to be drawn against the article and to be preheated by the air supply,
and means for subsequently moving the mold and plastic sheet together after the sheet is heated by the air supply so that the sheet will be drawn against the article by said vacuum means.

6. A mechanism for making plastic surfaced molded pulp articles comprising,
a porous pulp mold for supporting a shaped article,
means defining
a molding station,
a pressing station,
and a drying and surfacing station,
means for transporting said mold to each of said stations,
means at said molding station for depositing a layer of pulp on the surface of the mold,
means at said pressing station for applying a smoothing pressing surface to the exposed surface of an article on said mold,
means at said drying and surfacing station for drawing air continuously through the mold and article thereon with the air passing inwardly through the exposed surface of the article and then through the mold,
means at said drying and surfacing station supplying heated air to the exposed surface of the article on the mold,
and further means at the drying and surfacing station for supplying a sheet of plastic and applying the sheet of plastic to the surface of the article while at an elevated temperature from said heated air.

7. A mechanism for making plastic surfaced molded pulp articles comprising,
a porous pulp mold for supporting a shaped article,
means defining
a molding station,
a pressing station,
and a drying and surfacing station,
means for transporting said mold to each of said stations,
means at said molding station for depositing a layer of pulp on the surface of the mold,
means at said pressing station for applying a smoothing pressing surface to the exposed surface of an article on said mold,
means at said drying and surfacing station for drawing air continuously through the mold and article thereon with the air passing inwardly through the exposed surface of the article and then through the mold,
means at said drying and surfacing station supplying heated air to the exposed surface of the article on the mold,
means at said drying and surfacing station for drawing a sheet of plastic between said mold and said heated air supply means but spaced from the mold, and means for relatively moving the mold and plastic sheet together after the sheet has been preheated by said heated air supply means.

8. The method of making a plastic surfaced molded pulp article comprising,
coating a porous mold with a layer of wet pulp,
heating the wet pulp to form a dried article on the mold,
and supplying a sheet of thermoplastic and applying it in sheet form to the exposed surface of the article while said article remains warm.

9. The method for making plastic surfaced molded pulp articles comprising,
coating a porous mold with a layer of wet pulp,
drawing heated air inwardly through the wet pulp to form a dried article,
and supplying a sheet of thermoplastic and applying it to the surface of the article on the mold while the article remains warm and drawing the plastic sheet to the surface of the article by applying a suction through the mold.

10. The method of making plastic surfaced molded pulp articles comprising,
applying a layer of wet pulp to a porous mold,
directing a flow of heated air against the pulp on the mold surface,
forcing air through the porous mold and the pulp continuously while drying the pulp to form a dried article,
preheating a sheet of plastic and positioning the preheated sheet against the exposed surface of the article while warm,
and applying a pressure differential across the mold to force the plastic against the article.

11. The method of making a plastic surfaced molded pulp article comprising,
coating a porous mold with a layer of wet pulp to form an article thereon,
supplying a flow of heated air to the exposed surface of the article,
drawing the heated air through the article and through the porous mold,
positioning a sheet of plastic between the flow of heated air and the article on the mold but spaced from the article on the mold to preheat the sheet,
and relatively moving the preheated sheet and the article together so that the sheet is drawn against the surface of the article.

References Cited by the Examiner

UNITED STATES PATENTS

| | | | |
|---|---|---|---|
| 1,265,162 | 5/18 | Ayerst | 162—266 |
| 1,549,903 | 8/25 | Buel | 162—266 |
| 1,867,575 | 7/32 | Loetscher | 162—103 |
| 2,736,065 | 2/56 | Wilcox | 156—287 |

DONALL H. SYLVESTER, *Primary Examiner.*
MORRIS O. WOLK, *Examiner.*